United States Patent [19]
Tokura et al.

[11] Patent Number: 6,071,449
[45] Date of Patent: Jun. 6, 2000

[54] ACOUSTIC DIAPHRAGM MOLDING METAL MOLD APPARATUS AND ACOUSTIC DIAPHRAGM MOLDING METHOD

[75] Inventors: Kunihiko Tokura, Saitama; Masaru Uryu, Chiba, both of Japan

[73] Assignee: Sony Corporation, Tokyo, Japan

[21] Appl. No.: 09/057,533

[22] Filed: Apr. 9, 1998

[30] Foreign Application Priority Data

Apr. 15, 1997 [JP] Japan .................................. 9-097750

[51] Int. Cl.$^7$ ................................................. B29C 45/72
[52] U.S. Cl. .................... 264/161; 264/328.15; 425/549; 425/556
[58] Field of Search ................................ 264/328.1, 161, 264/328.15; 425/549, 556

[56] References Cited

PUBLICATIONS

Whelan, Injection Moulding Machines, Elsevier Applied Science Publishers, pp. 306–327, 1984.

*Primary Examiner*—Jill L. Heitbrink
*Attorney, Agent, or Firm*—Jay H. Maioli

[57] ABSTRACT

An acoustic diaphragm production method including a step of filling a molten synthetic resin material through a sprue bush into a cavity defined by an injection molding metal mold according to a configuration of an acoustic diaphragm, a step of cooling the sprue bush with a cooling medium such as water, so as to solidify the resin in the sprue bush, a step of taking out a product from the metal mold, and a step of cutting off from the product a portion including a cold gate by way of press processing.

5 Claims, 4 Drawing Sheets

ACOUSTIC DIAPHRAGM MOLDING METAL MOLD APPARATUS AND ACOUSTIC DIAPHRAGM MOLDING METHOD

BACKGROUND OF THE INVENTION

1. Field of the Invention

The present invention relates to an acoustic diaphragm molding die and an acoustic diaphragm producing method. In particular, the present invention relates to an acoustic diaphragm molding die and an acoustic diaphragm producing method using a cooling medium for cooling.

2. Description of the Prior Art

Conventionally, paper has been used as a material for an acoustic diaphragm. However, in order to improve characteristics as a diaphragm material and offer a wider selection of design including colors, an acoustic diaphragm made from a synthetic resin material by way of injection molding is now being spread.

Molding of these acoustic diaphragms is normally carried out by injection molding using a direct gate type metal mold, or a so-called cold gate. The cold gate is a technique for solidifying a synthetic resin portion remaining in a sprue gate and taking out it together with a molded product from an injection molding metal mold. By retaining the portion in the sprue gate in a solidified state, it is possible to move an acoustic diaphragm as a molded product to the next production step.

An injection molding consists of following steps: a step of measuring amount of a synthetic resin as a material, a step of injection of the resin material melted, a step of applying pressure, a step of cooling the injected resin material, a step of removal or eject from the metal mold, and a step of removal from the injection molding apparatus. The obtained product includes a portion solidified in a sprue gate, which portion is removed by way of press processing, so as to complete an acoustic diaphragm of, for example, cone shape.

By the way, thickness of an acoustic diaphragm is remarkably thin compared to ordinary synthetic resin products and accordingly, it is necessary to use as a material such a synthetic resin which will not be easily solidified. In other words, in order to be filled correctly in a cavity of a metal die, the synthetic resin material should have a high fluidity because the cavity is very narrow so as to be matched with the configuration of a diaphragm.

Consequently, the synthetic resin material filled in the cavity takes a long time to be solidified and a molding tact (one cycle time) tends to be prolonged, lowering the production efficiency, which in turn brings about increase of production costs.

One of the reasons which prolongs the molding tact is use of a cold gate. Most of the molding tact is used for cooling the synthetic resin remaining in the sprue gate.

It can also be considered to use, for example, a hot runner type so as to carry out molding without a cold gate. However, as has been described above, an acoustic diaphragm is very thin and the molding pressure is significantly increased. Practically, an existing injection molding apparatus cannot stand this pressure.

SUMMARY OF THE INVENTION

It is therefore an object of the present invention to provide an acoustic diaphragm molding metal mold which resolves the above mentioned problem.

It is another object of the present invention to provide an acoustic diaphragm molding method which resolves the above mentioned problem.

According to the present invention, there is provided an acoustic diaphragm molding metal mold including a fixed mold section, a movable mold section, and a cooling section. The movable mold section can move with respect to the fixed mold section and is used in combination with the fixed mold section to form a cavity in accordance with a configuration of an acoustic diaphragm. A resin material in a molten state is supplied through a gate section into the cavity. The cooling section is provided in the vicinity of the gate section.

According to the present invention, there is provided an acoustic diaphragm production method which includes a step of filling a molten resin material through a gate section into a cavity of a mold formed according to a configuration of an acoustic diaphragm, a step of cooling a gate section so as to solidify the resin in the gate section, and a step of removing a molded product from the mold.

DETAILED DESCRIPTION OF PREFERRED EMBODIMENTS

Hereinafter, description will be directed to embodiments the acoustic diaphragm molding metal mold and the acoustic diaphragm production method according to the present invention.

Figure 1:
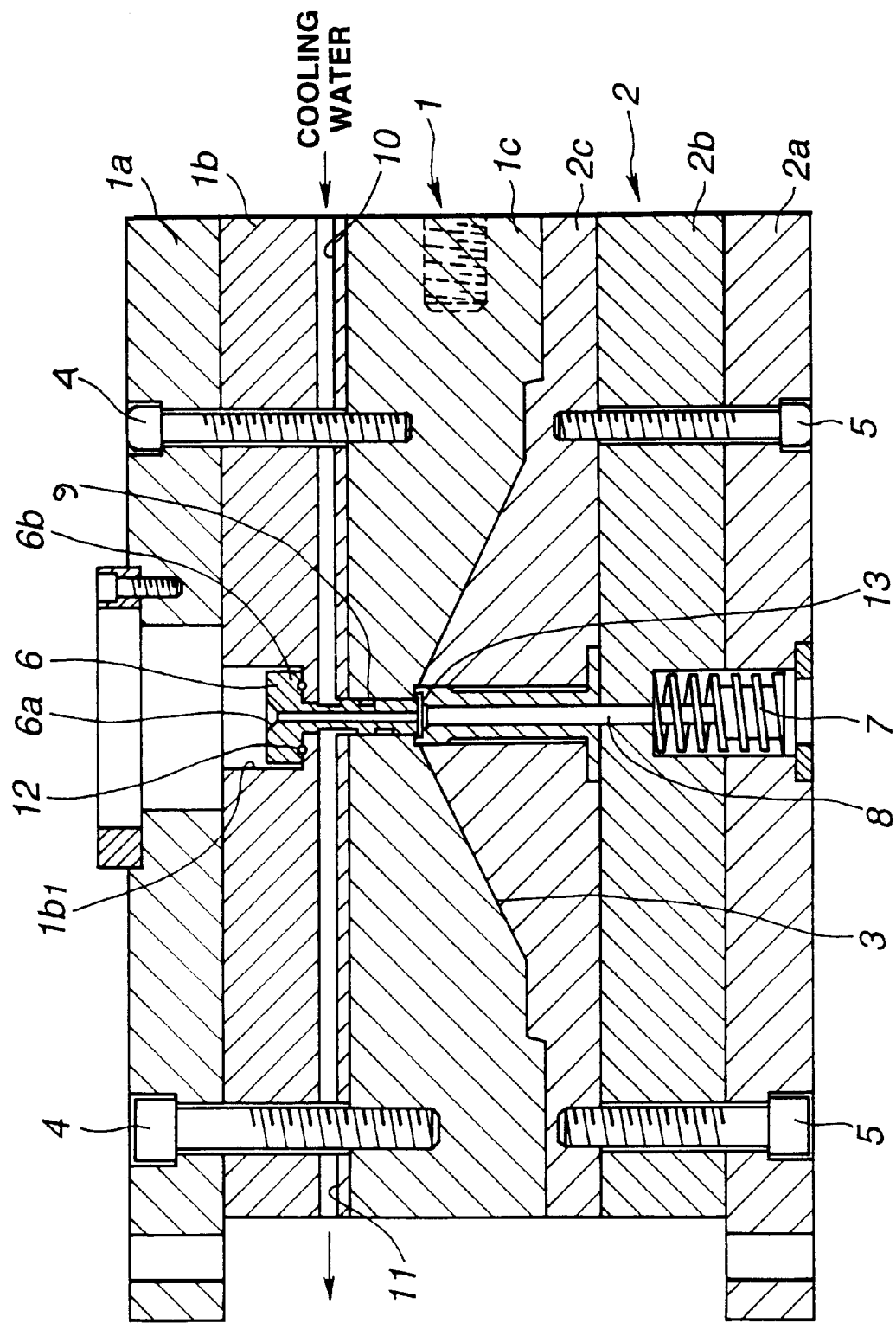
FIG. 1 is a cross sectional view showing an example of an injection molding metal mold apparatus according to an embodiment of the present invention.

FIG. 1 shows an acoustic diaphragm injection molding metal mold apparatus according to an embodiment of the present invention. This injection molding metal mold apparatus includes a fixed mold section 1 and a movable mold section 2. A cavity 3 defined by the fixed mold section 1 and the movable mold section 2 is filled with a synthetic resin material so as to mold an acoustic diaphragm.

The cavity 3 has a so-called cone configuration (cone or truncated cone). Because an acoustic diaphragm used in a speaker apparatus as well as in a head phone and a microphone should be formed with a very thin thickness, the cavity 3 is formed to be a very narrow space.

The fixed mold section 1 includes a fixed mold 1c which is firmly fixed through a fixed with a plurality of bolts 4 through a side backing panel 1b to a fixed side mounting panel 1a. The fixed mold 1c has an indentation of conic shape formed to define the cavity 3 and the bottom of the indentation communicates with a sprue bush 6 which will be described later.

The movable mold section 2, similarly as the fixed mold section 1, includes a movable mold 2c which is firmly fixed with a plurality of bolts 5 through a movable side backing panel 2b to a movable side mounting panel 2a. The movable mold 2c has a convex of a conical shape formed to define the cavity 3 and from the apex of this conical shape protrudes an ejector rod 8 which will be detailed later. When the cavity 3 is filled with a molten synthetic resin material from the sprue bush 6 which will be detailed later, the movable mold section 2 is retained at the position shown in FIG. 1 relative to the fixed mold section 1 by a predetermined fastening pressure, and after the synthetic resin in the cavity 3 and the sprue bush 6 is solidified, the movable mold section 2 is removed from the fixed mold section 1 so that a diaphragm as a product can be removed from the mold apparatus.

Figure 3:
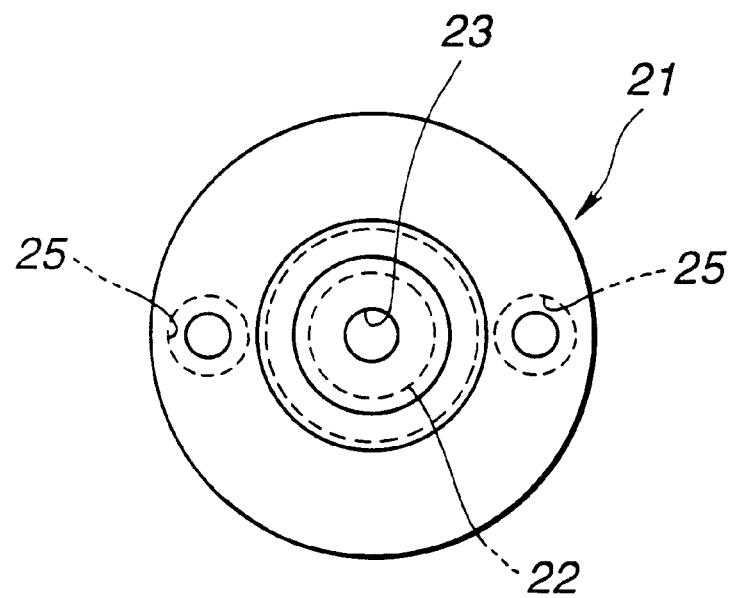
FIG. 3 is a bottom view of the sprue bush shown in FIG. 2.

As shown in FIG. 3, the cavity 3 is defined by the indentation of conical shape formed on the fixed mold 1c matched through a space with the conical convex formed on the movable mold 2c.

The sprue bush 6 is provided at the center of the bottom of the conical indentation of the fixed mold 1c and, to oppose this, the ejector rod 8 is provided at the center of the conical convex of the movable mold section 2.

The sprue bush 6 has an abutment section 6a of spherical configuration to which brought into abutment is a nozzle provided at the tip of a cylinder for supplying a molten synthetic resin material so that the molten synthetic resin is supplied through the sprue bush 6 to fill the cavity 3 with a predetermined pressure. In the present embodiment, a so-called direct gate method is employed and the synthetic resin remaining in the sprue bush 6 becomes a cold gate after molding.

The ejector rod 8 serves to remove a product from the metal mold. After molding is complete, the movable mold section 2 is moved in the direction apart from the fixed mold section 1. When the injection molding metal mold is opened, the ejector rod 8 is moved by a coil sprint 7 upward in FIG. 1 so as to protrude from the apex of the convex of truncated cone. The tip of the ejector rod 8 pushes an acoustic diaphragm as a product so as to remove from the movable mold 2c. Between the ejector rod 8 and the sprue bush 6, there is provided a packing 13.

The aforementioned is the basic configuration of the injection molding metal mold apparatus. According to the present invention, there is provided a cooling mechanism for cooling the sprue bush as a gate section, so as to promote cooling of the gate section.

Normally, an injection molding metal mold apparatus is provided with a metal mold temperature adjusting (cooling) mechanism by way of flowing a medium such as a warm water is flown so as to maintain a predetermined temperature of the metal mold. However, in the present invention, a cooling mechanism is provided only for cooling the gate section.

As shown in FIG. 1, this cooling mechanism is realized by a helical groove 9 formed on a circumferential surface of the sprue bush 6 through which a cooling medium is flown so as to cool a portion of the sprue bush 6 which becomes the gate section.

The fixed side backing panel 1b of the fixed mold section 1 is provided with a cooling medium introduction pipe 10 and a cooling medium discharge pipe 11 which communicate with the groove 9 of the sprue bush 6. A cooling medium supplied from a pump (not depicted) or the like through the introduction pipe 10 flows through the groove 9 formed on the sprue bush 6 and is discharged from the discharge pipe 11. For example, a suction apparatus may be provided at the tip of the discharge pipe 11 so as to facilitate flow of the cooling medium.

Here, as has been described above, the sprue bush 6 is in abutment through the packing 12 and 13 with the indentation 1b, of the fixed side backing panel 1b and the ejector rod 8, so as to prevent leak of the cooling medium flowing through the groove 9 of the sprue bush 6 into the fixed mold section 1 and into the cavity 3.

The cooling medium serves to cool the synthetic resin material in the sprue bush 6 as the gate section and its temperature is set to a value lower than the metal mold temperature. When considering the cooling effect, it is effective that the temperature of the cooling medium be set to 15° C. or below, which enables to solidify the synthetic resin material in the sprue bush 6 for short time.

The effect of the cooling medium is increased as the temperature is lowered, but if the temperature is too low, condensation may be caused in the mold apparatus. In order to successively carry out injection molding of acoustic diaphragms as molded products, the temperature of the cooling medium can be lowered to a great degree without causing condensation in the mold apparatus. Consequently, the temperature of the cooling medium should be set according to the injection molding condition so as to enable to obtain a preferable cooling effect without causing condensation in the mold apparatus.

The cooling medium may be water or various solvents. For example, when the temperature is to be set to 0° C. or below, it is possible to use a mixture of water and alcohol. However, when considering the handling easiness and costs, water is a preferable cooling medium. The temperature of the water as a cooling medium is preferably set to a range from 0 to 15° C. considering results of various experiments.

Water as a cooling medium is introduced from the cooling medium introduction pipe 10 by using a pump (not depicted) to flow through the groove 9 of the sprue bush 6, reaching the cooling medium discharge pipe 11, thus cooling the sprue bush 6 as the gate section and solidifying the synthetic resin in the sprue bush for a short time. As a result, it is possible to shorten the molding tact, i.e., time required for one cycle of resin filling, mold separation, and taking out of a product.

Figure 2:
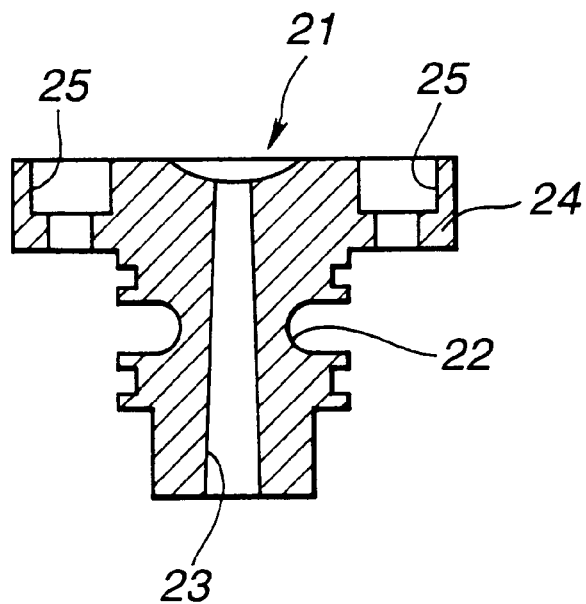
FIG. 2 is a cross sectional view showing another example of a sprue bush.

It should be noted that the sprue bush 6 may have a configuration other than the one shown in FIG. 1. For example, in a case of a short sprue bush 21, as shown in FIG. 2 and FIG. 3, it is sufficient to form an annular groove 22 instead of a helical groove on the circumferential surface of the sprue bush 21. This is sufficient to obtain a sufficient cooling effect. The sprue bush 21 shown in FIG. 2 has an identical configuration as the sprue bush shown in FIG. 1 excluding that the sprue bush 21 has a sprue gate 23 and a flange portion 24 provided with a screw hole 25 through which thrusts a fixing screw to be mounted in the indentation $1b_1$ of the fixed side backing plate 1b.

Next, description will be directed to an acoustic diaphragm molding method using the injection molding metal mold apparatus shown in FIG. 1.

In order to mold an acoustic diaphragm as a product, firstly, the movable mold section 2 is brought into abutment with the fixed mold section 1 so as to close the mold apparatus, and a molten synthetic resin material such as a polyolefin resin is injected from a cylinder (not depicted) in abutment with the abutment portion 6a of the sprue bush 6. In this process, the mold apparatus is controlled to have a predetermined temperature. The molten polyolefin resin material is supplied from a nozzle provided at the tip of the cylinder (not depicted) into the injection molding metal mold apparatus so as to pass through the sprue bush 6 into the cavity 3. During this process, water as the cooling medium is flown from the cooling medium introduction pipe 10 so as to pass through the groove 9 of the sprue bush 6 reaching the cooling medium discharge pipe 11, while cooling the sprue bush 6 as the gate section.

Next, the movable mold section 2 is moved apart from the fixed mold section 1 so as to open the mold apparatus and the ejector rod 8 is operated to remove a diaphragm as a product from the movable mold section 2. The product at this stage is, as shown in FIG. 4 and FIG. 5, an acoustic diaphragm 31 of a so-called conic configuration having at its center a cold gate 32 remaining.

When taking out the molded acoustic diaphragm 31, this cold gate is grasped and the cold gate 32 should be in a solidified state at this stage. According to the present invention, as has been described above, a cooling medium is flown for a portion of the injection molding metal mold apparatus corresponding to the cold gate 32, i.e., around the sprue bush 6, which significantly shorten the time required for cooling and solidifying the synthetic resin in the sprue bush 6. In molding of the acoustic diaphragm 31, the time required for solidifying the cold gate 32 is determinative in the molding tact and accordingly, reduction of the time required for solidifying the synthetic resin material in the sprue bush 6 significantly improves the molding tact.

Figure 4:
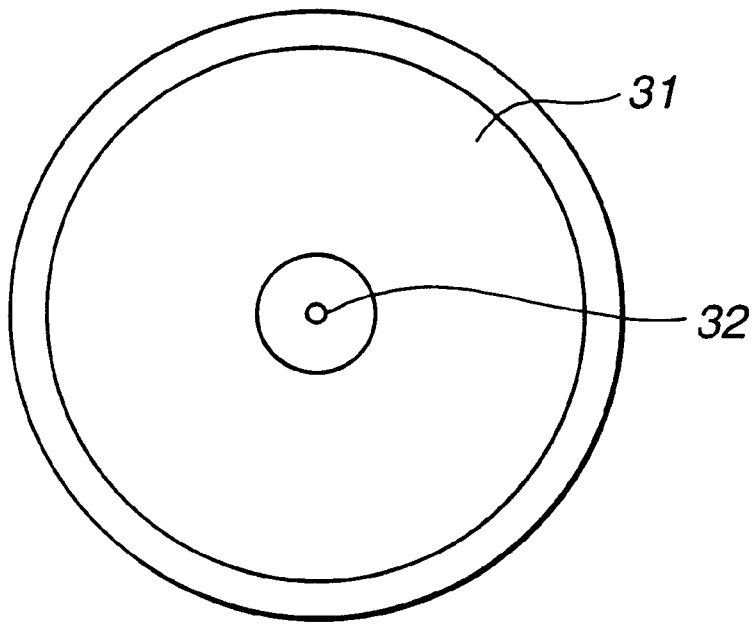
FIG. 4 is a plan view showing an example of product having a cold gate.
Figure 5:
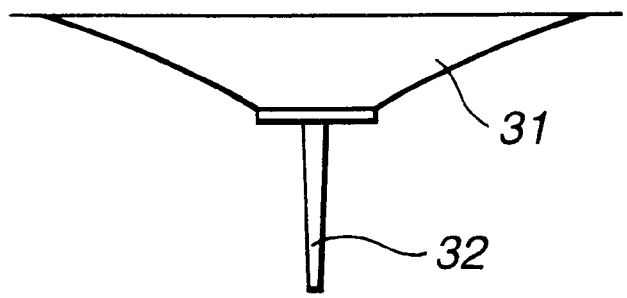
FIG. 5 is a side view of the product having a cold gate shown in FIG. 4.
Figure 6:
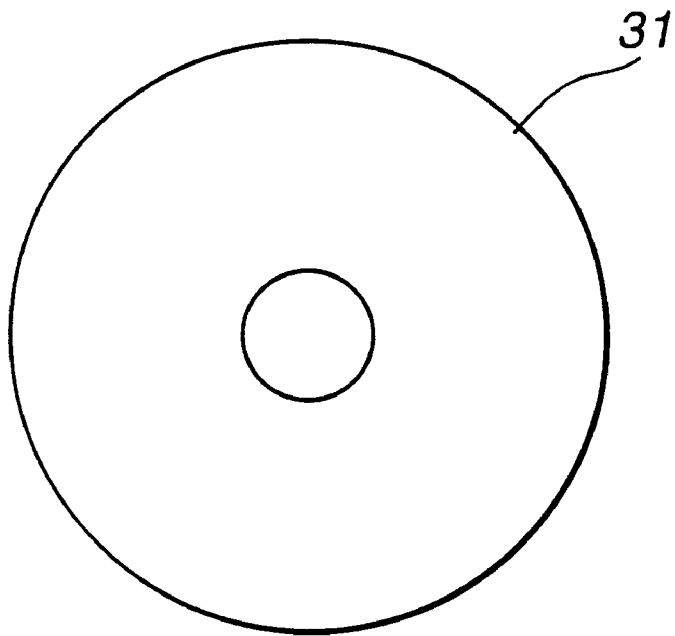
FIG. 6 is a plan view showing a configuration example of an acoustic diaphragm molded.
Figure 7:
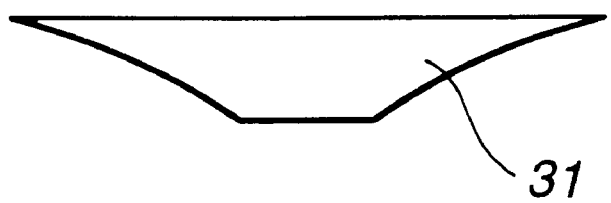
FIG. 7 is a side view of the molded acoustic diaphragm shown in FIG. 6.

The product of the configuration shown in FIG. 4 and FIG. 5 taken out of the injection molding metal mold apparatus is subjected to a press processing to punch off the center portion of the product including the cold gate 32, so as to obtain the acoustic diaphragm of conic shape shown in FIG. 6 and FIG. 7.

Hereinafter, description will be directed to specific experiments of actual injection molding of an acoustic diaphragm carried out according to the aforementioned present invention.

Experiment 1

The injection molding apparatus shown in FIG. 1 was used to mold a speaker diaphragm of conic shape having a diameter of 16 cm. The synthetic resin material used for this injection molding was a polypropylene resin containing an inorganic reinforcing agent.

The injection molding was carried out with a molding temperature of 250° C. and the molding apparatus with its fixed mold section and the movable mold section was set to 40° C. The temperature of water as a cooling medium was set to 15° C. The obtained product was taken out by holding the cold gate by using a robot or manually by a worker.

The time required for cooling the sprue bush portion so that the cold gate can be taken out without deformation was 8 seconds, and the molding tact, i.e., the time required from the measurement of the polypropylene resin containing an inorganic reinforcing agent up to the opening of the molding apparatus and taking out of a product by holding the cold gate portion was about 12 seconds.

Comparative Example 1

An injection molding was carried out in the same way as Experiment 1, but without carrying out any active cooling of the sprue bush by using water. A product was taken out from the molding apparatus, similarly in Experiment 1, by directly holding the cold gate.

The time required for solidification of the cold gate after molding for holding was about 18 seconds and the molding tact was 22 seconds.

Experiment 2

Like in Experiment 1, injection molding was carried out while actively cooling the sprue bush and the product was taken out from the molding apparatus by suction-holding the outer circumference of the product, i.e., a portion constituting the diaphragm as a product, with a suction mechanism provided on a robot.

In this case, as the cold gate is not directly grasped by the robot, it is possible to take out the product from the molding apparatus with the cold gate portion solidified to such an extent that it will not be deformed by its weight. As a result, the cooling time of the sprue bush with water was 5 seconds and the molding tact, i.e., the time required from the measurement of the aforementioned polypropylene material up to opening of the molding apparatus and taking out of the production by way of suction holding from the molding apparatus was about 9 seconds.

Comparative Example 2

Injection molding was carried out by setting the same conditions as in Experiment 2 except for that no cooling was carried out for the sprue bush 6, and the product was taken out from the molding apparatus by way of suction holding.

As a result, the time required for the cold gate portion to such an extent that it will not be deformed by its weight was about 15 seconds.

From the results of the aforementioned Experiments, it is clear that by providing a cooling mechanism for cooling a sprue bush portion in the injection molding apparatus, it is possible to significantly reduce the molding tact from the 19 to 22 seconds of the Comparative Examples to the 9 to 12 seconds, thus enabling to twice increase the production efficiency.

As is clear from the aforementioned, according to the present invention, it is possible to significantly reduce the cooling time of the synthetic resin material in a sprue bush as a gate portion which is difficult to be solidified. This enables to enhance the molding tact.

Thus, it is possible to improve the acoustic diaphragm production efficiency and reduce production costs.

It should be noted that the present invention can be modified in various ways within the scope of the invention.

What is claimed is:

1. An acoustic diaphragm production method comprising the steps of:

filling a synthetic resin material into a cavity defined by a metal mold formed in a shape of an acoustic diaphragm;

cooling only a gate section using a cooling medium so as to solidify said synthetic resin material in said gate section; and taking out a molded product from said metal mold, wherein said cooling medium has a temperature of 15° C. or below.

2. The acoustic diaphragm production method as claimed in claim 1, further comprising the step of cutting off a portion including a cold gate from said molded product taken out from said metal mold.

3. An acoustic diaphragm molding metal mold apparatus comprising:

a fixed mold section;

a movable mold section for defining with said fixed mold section a cavity formed in a shape of an acoustic diaphragm;

a gate section for supplying a molten resin material to fill said cavity; and cooling means for cooling only said gate section using a cooling medium, wherein said cooling means has a flow path around said gate section in said fixed mold section so that the cooling medium flows through said flow path, thereby cooling said gate section, and wherein said gate section includes a sprue bush for injecting said molten resin material into said cavity and said sprue bush includes on an outer circumference thereof a groove for flowing said cooling medium.

4. The acoustic diaphragm molding metal apparatus as claimed in claim 3, further comprising a first packing between said sprue bush and said fixed mold section.

5. The acoustic diaphragm molding metal mold apparatus as claimed in claim 4, wherein said movable mold section includes an ejector mechanism, and a second packing is provided between said sprue bush and said ejector mechanism.

* * * * *